US008387872B2

(12) United States Patent
Buffa

(10) Patent No.: US 8,387,872 B2
(45) Date of Patent: Mar. 5, 2013

(54) VENDING MACHINE MEMORY KEY AND/OR CARD READER

(75) Inventor: Rinaldo Buffa, Bannia di Fiume Veneto (IT)

(73) Assignee: N&W Innovative Solutions S.r.l. con Unico Socio, Chions (IT)

( * ) Notice: Subject to any disclaimer, the term of this patent is extended or adjusted under 35 U.S.C. 154(b) by 115 days.

(21) Appl. No.: 12/992,516

(22) PCT Filed: May 12, 2009

(86) PCT No.: PCT/EP2009/055723
§ 371 (c)(1), (2), (4) Date: Mar. 14, 2011

(87) PCT Pub. No.: WO2009/138404
PCT Pub. Date: Nov. 19, 2009

(65) Prior Publication Data

US 2011/0259958 A1 Oct. 27, 2011

(30) Foreign Application Priority Data

May 13, 2008 (IT) .............................. TO2008A0354

(51) Int. Cl.
*G06F 7/08* (2006.01)

(52) U.S. Cl. ........................................ 235/381; 235/439

(58) Field of Classification Search .................. 235/381, 235/439
See application file for complete search history.

(56) References Cited

U.S. PATENT DOCUMENTS

| | | | | |
|---|---|---|---|---|
| 4,669,596 | A | 6/1987 | Capers et al. | |
| 5,955,718 | A | 9/1999 | Levasseur et al. | |
| 6,367,696 | B1 * | 4/2002 | Inamitsu et al. | 235/381 |
| 6,397,126 | B1 * | 5/2002 | Nelson | 700/236 |
| 7,131,575 | B1 * | 11/2006 | Kolls | 235/379 |

FOREIGN PATENT DOCUMENTS

| | | | |
|---|---|---|---|
| CN | 1653654 | A | 8/2005 |
| CN | 273808 | Y | 11/2005 |
| GB | 2 146 852 | A | 4/1985 |
| SE | 393 903 | B | 5/1977 |
| WO | WO 03/100916 | A1 | 12/2003 |

* cited by examiner

*Primary Examiner* — Allyson Trail
(74) *Attorney, Agent, or Firm* — Dickstein Shapiro LLP

(57) ABSTRACT

A memory key and/or card reader, which can be fitted to an outer casing of a vending machine, and has a memory key and/or card electronic read circuit, in turn having an internal electric connector connectable to an external electric connector of a communication cable. The reader also has a housing housing the electronic read circuit; and a cable-clamping device which has a click-on fastening mechanism for fixing the cable clamping device firmly, but in easily removable manner, to the housing to maintain connection between the external connector and the internal connector, and a semicylindrical portion for housing an end portion of the communication cable.

7 Claims, 5 Drawing Sheets

VENDING MACHINE MEMORY KEY AND/OR CARD READER

TECHNICAL FIELD

The present invention relates to a vending machine memory key and/or card reader.

More specifically, the present invention relates to a modular reader designed to be fitted to the outside of a product and/or service vending machine; to which the following description refers purely by way of example.

BACKGROUND ART

As is known, vending machines for packaged food products, such as snacks, soft drinks, etc., normally comprise a casing housing the food products to be dispensed; and a reading/identification device which, when a food product is requested by the user, is designed to read and identify data in a user memory key/card.

The front panel of the casing normally has a contoured slot, in which the user inserts a memory key and/or card; and the reading device comprises a reader housed entirely inside the casing, facing the slot in the casing.

More specifically, the reader has an opening for receiving an end portion of the memory key and/or card, and is fixed to the inner face of the front wall of the casing, with its opening aligned with the slot.

The reading device also normally comprises an electronic identification unit housed inside the casing and connected to the reader by an electric cable to receive the user data read by the reader.

A need is felt among vending machine manufacturers to simplify assembly and maintenance of reading devices of the above type.

Accordingly, one solution proposed is to fix the reader directly to the exposed outer face of the machine to enable fast assembly and/or maintenance. This solution, however, has several drawbacks: to begin with, fixing the reader to the outside of the casing obviously exposes the internal electronic circuits of the reader to contact with water/moisture or liquid foods accidentally spilled on the reader by the user.

In addition, wiring the external reader to the internal electronic identification unit calls for a through hole in the front wall of the casing, through which to thread the electric cable connecting the reader to the electronic identification unit. When assembling/servicing the reader, however, any sharp portions on the inner edge of the hole may damage the electric cable.

DISCLOSURE OF INVENTION

It is an object of the present invention, therefore, to provide a memory key/card reader that can be fitted to an outer wall of a vending machine casing, and designed to eliminate the aforementioned drawbacks.

According to the present invention, there is provided a vending machine memory key/card reader as claimed in claim 1 and preferably, though not necessarily, in any one of the Claims depending directly or indirectly on claim 1.

According to the present invention, there is also provided a vending machine as claimed in claim 7.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
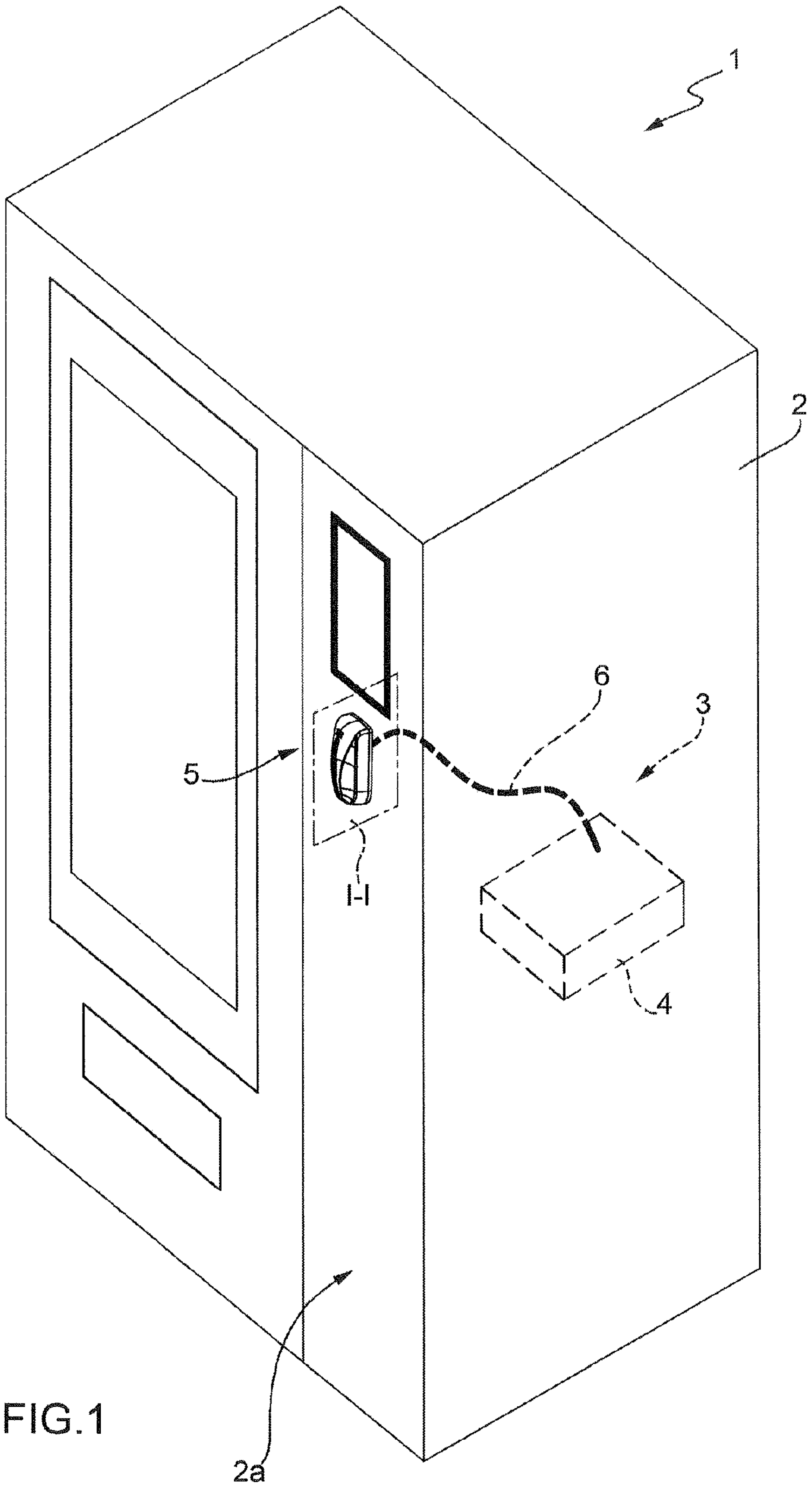
FIG. 1 shows a view in perspective of a product/service vending machine featuring a reader in accordance with the teachings of the present invention.

Number 1 in FIG. 1 indicates as a whole a vending machine for dispensing user-requested products and/or services.

Vending machine 1 substantially comprises a preferably, though not necessarily, parallelepiped-shaped casing 2 housing the products/services to be dispensed.

Vending machine 1 also comprises a reading device 3, in turn comprising a reader 5, which can be fitted to the outside of casing 2 and provides for reading user data contained in a memory key/card (not shown), and an electronic control unit 4 housed inside casing 2 and which controls dispensing of the products as a function of the data in the memory key/card.

Figure 4:
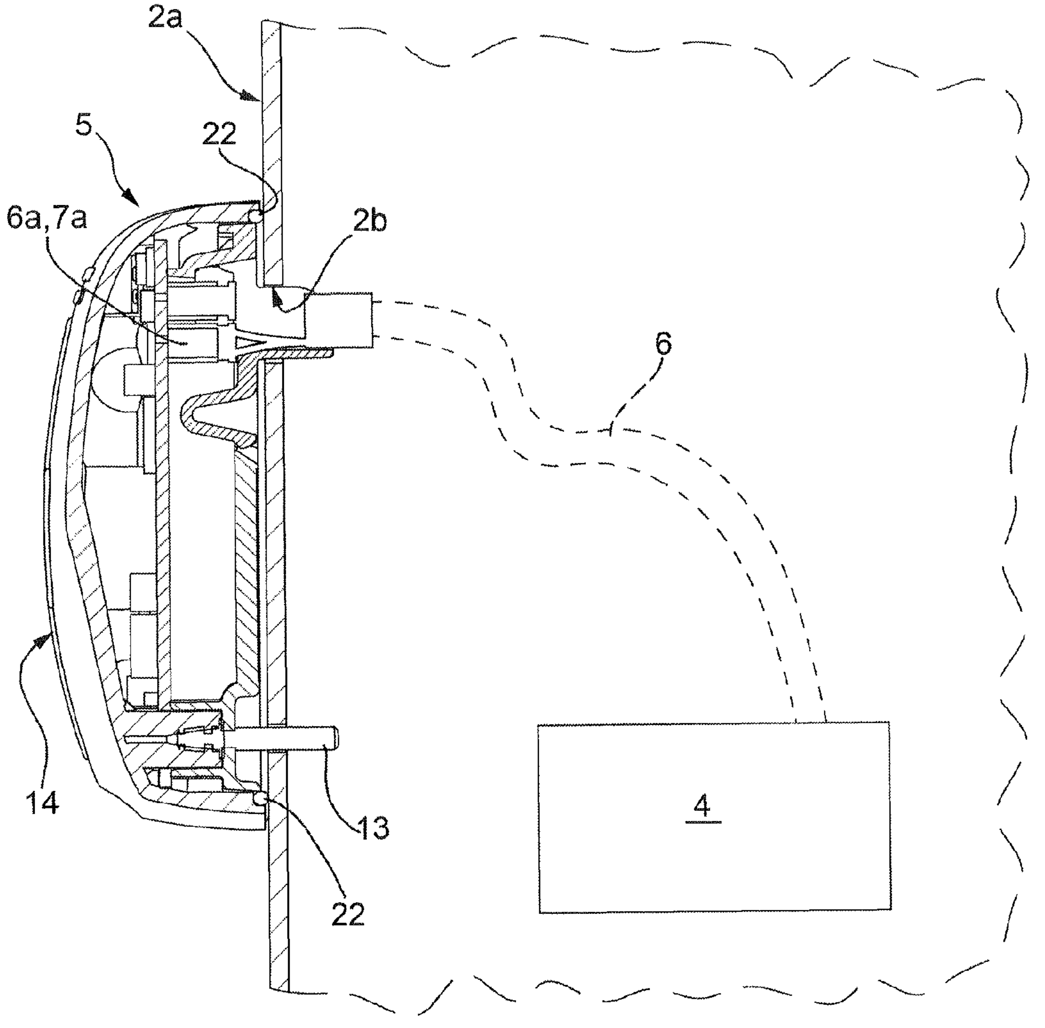
FIG. 4 shows a larger-scale section of the reader along line I-I in FIG. 1.

In the FIGS. 1 and 4 example, reader 5 is fixed firmly, but in easily removable manner, to the exposed face of a preferably front wall 2*a* of casing 2, and is connected electrically to electronic control unit 4 by a communication cable 6 to supply electronic control unit 4 with the user data read on the memory key/card, to enable dispensing of the requested product/service.

Figure 2:
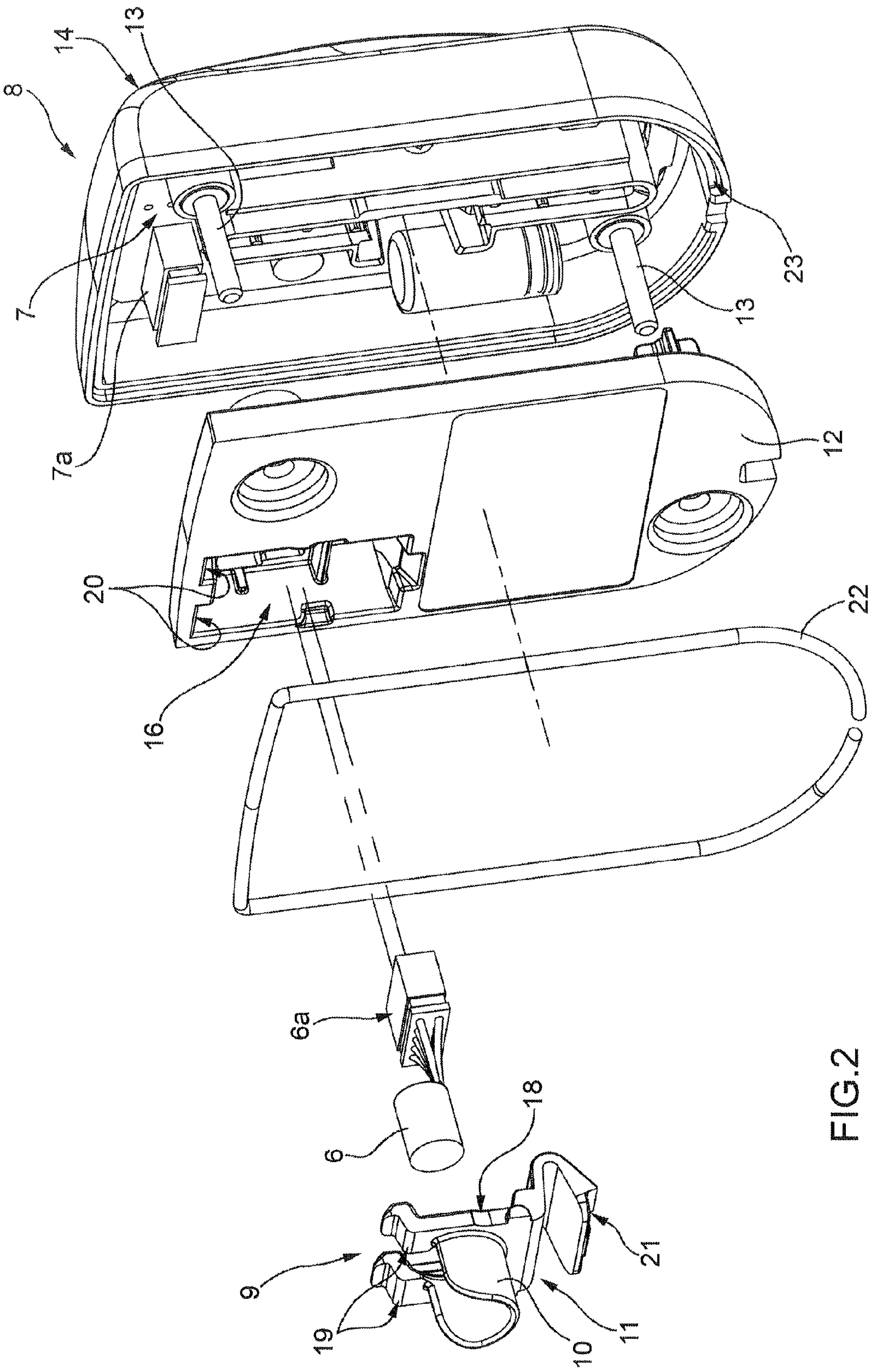
FIGS. 2 and 3 show exploded views of the FIG. 1 reader.
Figure 3:
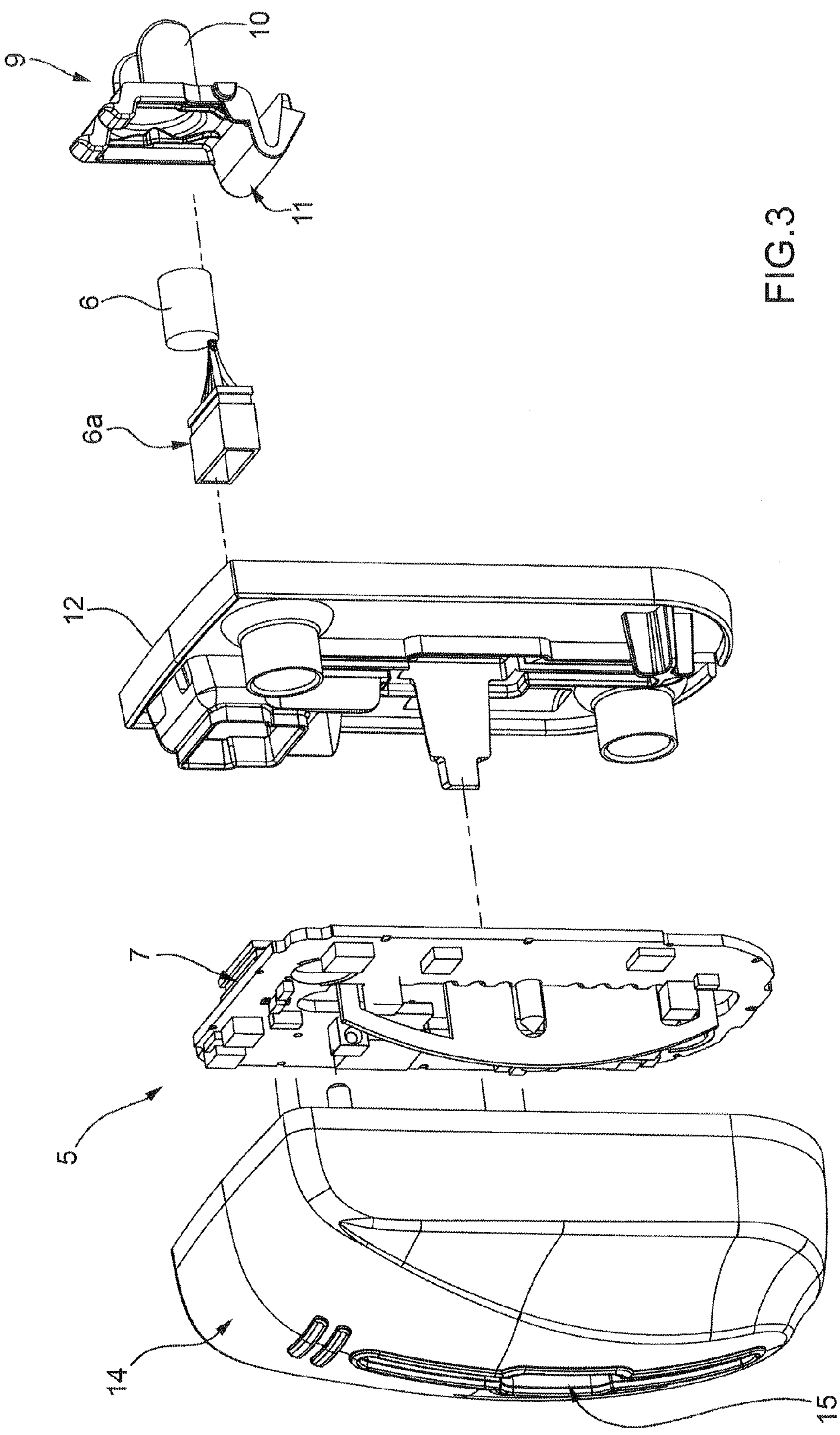

With reference to FIGS. 2 and 3, reader 5 comprises an electronic board fitted with the electronic components of an electronic circuit 7, which is designed to read the user data on the memory key/card, and has an internal connector 7*a* connectable to an external connector 6*a* on communication cable 6.

Reader 5 also comprises a housing 8 housing electronic circuit 7; and a cable clamping device 9, which has a click-on fastening mechanism 11 for securing cable clamping device 9 firmly to housing 8 and preventing disconnection of external connector 6*a* from internal connector 7*a*, and a substantially semicylindrical portion 10 for housing an end portion of communication cable 6.

More specifically, housing 8 comprises a rear supporting plate 12, which is fixed to front wall 2*a* of vending machine 1 by means of fasteners, e.g. screws, 13, and serves to support electronic circuit 7; and a front half-shell 14, which is fitted to supporting plate 12 to form with it a closed housing 8 housing electronic circuit 7.

The exposed portion of front half-shell 14 has a contoured elongated slot 15 for insertion of the memory key/card, and a portion of supporting plate 12 facing internal connector 7*a* of electronic circuit 7 has a seat 16, which is open at the rear to permit passage of external connector 6*a*, and is designed to click cable clamping device 9 inside.

In the FIGS. 2, 3, 5 and 6 example, cable clamping device 9 comprises a substantially fork-shaped plate 18, in turn comprising two parallel appendixes 19, which are spaced apart, and the respective free ends of which are substantially hook-shaped to engage respective grooves 20 formed in an inner wall of seat 16.

The end of plate 18 opposite the two appendixes 19 has a substantially U-shaped tab 21 designed to flex temporarily towards semicylindrical portion 10, when inserting cable clamping device 9 inside seat 16, and then to part outwards, once it is inserted inside seat 16, so that its free end rests on an inner projection on a lateral wall of seat 16 to secure cable clamping device 9 firmly to supporting plate 12.

Appendixes 19 and tab 21 define the click-on fastening mechanism 11 of cable clamping device 9.

Semicylindrical portion 10 extends from plate 18, with its axis perpendicular to appendixes 19, and is designed to house communication cable 6, and also to fit inside a through hole 2*b*, formed in front wall 2*a* of machine 1, when reader 5 is fixed to wall 2*a*.

Reader 5 also comprises an annular seal 22, which fits inside a peripheral groove 23 formed on the edge of front half-shell 14. More specifically, peripheral groove 23 extends along the lateral edge of front half-shell 14, and cooperates with the peripheral edge of supporting plate 12 to grip annular seal 22 inside the groove and so hermetically seal the rear of housing 8.

Figure 6:
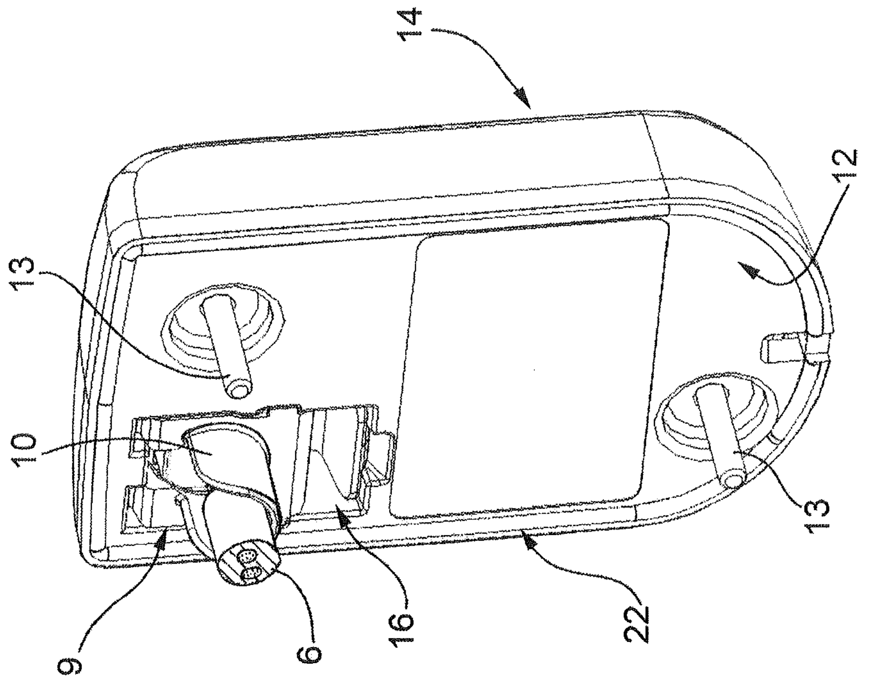
FIGS. 5 and 6 show two rear views in perspective of the reader with a cable clamping device in two different operating positions.

With reference to FIG. 6 in particular, annular seal 22 is gripped between front half-shell 14 and the outer lateral edge of supporting plate 12, so as to project outwards and rest on front wall 2*a* of the casing when reader 5 is fixed to the casing.

Figure 5:
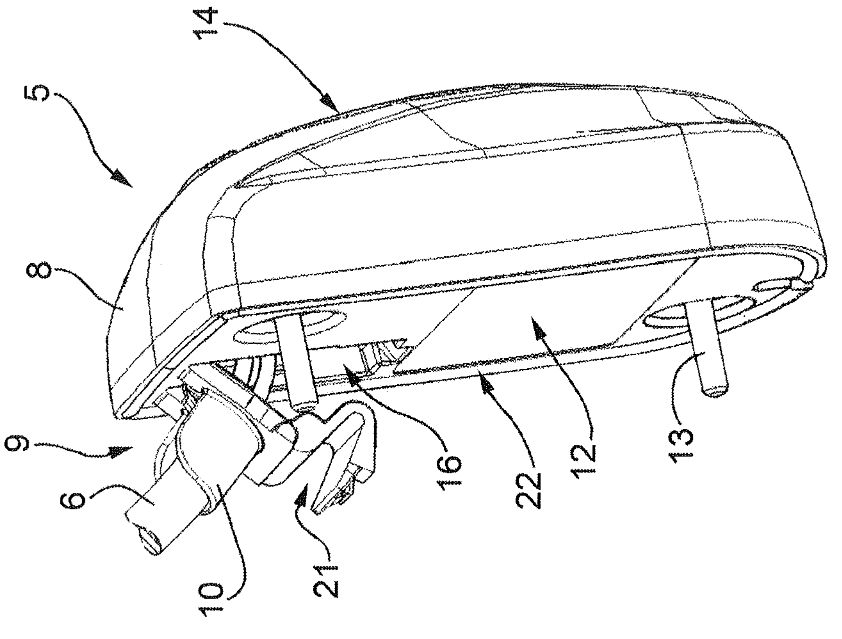

In actual use, once connectors 6*a* and 7*a* are connected, cable 6 is inserted inside the semicylindrical portion, and the ends of appendixes 19 are inserted inside respective grooves 20 (FIG. 5). At this point, clamping of cable 6 is completed by pressing the U-shaped tab towards seat 16, so the end of the tab rests on the projection inside the seat (FIG. 6).

Once cable 6 is clamped by cable clamping device 9, the fitter fixes reader 5 to front wall 2*a* of vending machine 1 by inserting semicylindrical portion 10 inside through hole 2*b* (FIG. 4).

Reader 5 has several advantages : firstly, the semicylindrical portion of the cable clamping device prevents damage to the electric cable on the sharp inner edge of the hole in the casing, when fitting the reader to the vending machine casing.

Secondly, the annular seal hermetically seals the rear of the housing to protect the electronic circuit inside.

And finally, the click-on fastening mechanism ensures stable connection, and prevents accidental disconnection, of the internal and external connectors.

Clearly, changes may be made to the reader as described and illustrated herein without, however, departing from the scope of the present invention as defined in the accompanying Claims.

The invention claimed is:

1. A reader (5), for reading memory keys and/or cards, which can be fitted to an outer casing (2) of a vending machine (1), and comprises an electronic read circuit (7) for reading said memory keys and/or cards, and which in turn comprises an internal electric connector (7*a*) connectable to an external electric connector (6*a*) of a communication cable (6); said reader (5) being characterized by comprising a housing (8) housing said electronic read circuit (7); and a cable clamping device (9) which in turn comprises a click-on fastening mechanism (11) for fixing the cable clamping device (9) firmly, but in an easily removable manner, to said housing (8) to maintain connection between said external connector (6*a*) and said internal connector (7*a*), and a semicylindrical portion (10) for housing an end portion of said communication cable (6).

2. A reader as claimed in claim 1, wherein said housing (8) comprises a front shell (14), in which a through opening (15) is formed for insertion of said memory keys and/or cards; and a rear supporting plate (12) which rests on the edge of said front shell (14) with the interposition of an annular seal (22).

3. A reader as claimed in claim 2, wherein said cable clamping device (9) comprises a peripheral seat (23) formed along the lateral edge of said front shell (14); said annular seal (22) being fitted inside said peripheral seat (23), and being gripped inside the peripheral seat (23) by the edge of the rear supporting plate (12).

4. A reader as claimed in claim 1, wherein said rear supporting plate (12) comprises a seat (16) facing said internal connector (7*a*);

said cable clamping device (9) being designed to click into said seat (16) of said rear supporting plate (12).

5. A reader as claimed in claim 4, wherein said cable clamping device (9) comprises a fork-shaped plate (18) having two appendixes (19), the respective free ends of which are hook-shaped to engage respective through openings (20) formed in an inner wall of said seat (16) of said rear supporting plate (12).

6. A reader as claimed in claim 5, wherein the end, opposite the two appendixes (19), of said plate (18) of said cable clamping device (9) has a U-shaped tab (21) shaped to click into said seat (16) of the rear supporting plate (12).

7. A vending machine (1) for products, comprising a casing (2) for housing said products; and a reading device (3) in turn comprising a memory key and/or card reader (5), and an electronic control unit (4) connected to said reader (5) by an electric communication cable (6); said reader (5) comprising an electronic read circuit (7) having an internal electric connector (7*a*) connectable to an external electric connector (6*a*) of said communication cable (6); a wall (2*a*) of said casing (2) having a through hole (2*b*) in which said communication cable (6) is fitted; and said vending machine (1) being characterized in that said reader (5) comprises a housing (8) housing said electronic read circuit (7); and a cable clamping device (9) in turn comprising a click-on fastening mechanism (11) for fixing the cable clamping device (9) firmly, but in an easily removable manner, to said housing (8) to keep said external connector (6*a*) connected to said internal connector (7*a*), and a semicylindrical portion (10) for housing an end portion of said communication cable (6) and which fits inside said through hole (2*b*) in said casing (2).

* * * * *

UNITED STATES PATENT AND TRADEMARK OFFICE

CERTIFICATE OF CORRECTION

PATENT NO. : 8,387,872 B2
APPLICATION NO. : 12/992516
DATED : March 5, 2013
INVENTOR(S) : Rinaldo Buffa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 235 days.

Signed and Sealed this
First Day of September, 2015

Michelle K. Lee
*Director of the United States Patent and Trademark Office*